(12) United States Patent
Williamson

(10) Patent No.: US 11,000,044 B1
(45) Date of Patent: *May 11, 2021

(54) FISH CLEANING TABLE

(71) Applicant: Brian Williamson, Mobile, AL (US)

(72) Inventor: Brian Williamson, Mobile, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/852,311

(22) Filed: Apr. 17, 2020

Related U.S. Application Data

(63) Continuation-in-part of application No. 16/439,629, filed on Jun. 12, 2019.

(60) Provisional application No. 62/683,916, filed on Jun. 12, 2018.

(51) Int. Cl.
*A22C 25/02* (2006.01)
*A47B 37/04* (2006.01)
*A47B 13/00* (2006.01)

(52) U.S. Cl.
CPC .......... *A22C 25/025* (2013.01); *A47B 13/003* (2013.01); *A47B 37/04* (2013.01); *A47B 2013/006* (2013.01); *A47B 2200/0019* (2013.01); *A47B 2200/0066* (2013.01)

(58) Field of Classification Search
CPC ....... A22C 25/025; A22C 25/06; A47B 37/04; A47B 13/16; A47B 2200/0019; A47B 2200/03
USPC .................. 108/42, 44, 47, 24, 25; 248/235
See application file for complete search history.

(56) References Cited

U.S. PATENT DOCUMENTS

| | | | | |
|---|---|---|---|---|
| 1,863,597 A | * | 6/1932 | Handelan | A47F 7/0071 108/24 |
| 1,952,568 A | * | 3/1934 | Schapp | A47L 15/0086 134/105 |
| 2,021,530 A | * | 11/1935 | Tyler | A47J 43/00 108/24 |
| 2,022,591 A | * | 11/1935 | Everitt | A47B 31/00 312/229 |
| 3,484,896 A | * | 12/1969 | Greenman | A22C 25/025 452/195 |
| 5,025,639 A | * | 6/1991 | Thomas | A47B 31/02 62/258 |
| 5,158,023 A | * | 10/1992 | Allen | E04G 5/00 108/42 |
| 6,397,761 B1 | * | 6/2002 | Moore | A47B 9/10 108/147 |
| 6,427,259 B1 | * | 8/2002 | Cawthon | A22C 25/025 4/619 |
| 7,066,096 B1 | * | 6/2006 | Harker | B60R 15/02 108/44 |

(Continued)

*Primary Examiner* — Jose V Chen
(74) *Attorney, Agent, or Firm* — AdamsIP, LLC; Stephen Thompson; James Adams

(57) ABSTRACT

A table has a table top that is fixedly attached to a support leg that forms a water pipe having an inlet and an outlet connection fitting for connecting a water supply line and a hose directly to the table so that water may flow to the hose through the leg of the table. The table may be secured to an edge of a dock over water using a bracket. The table top may be cleaned with water spray directly from the hose. Rear support legs of the table may form hollow tubes each having an upper open end and a lower open end at opposing ends of the tube. Each upper open end is defined by an opening on the top side of the table top. When hosing the table after cleaning fish, blood and other remains of fish may be flushed down through the tubes directly into the water below.

20 Claims, 8 Drawing Sheets

(56) References Cited

U.S. PATENT DOCUMENTS

| | | | | |
|---|---|---|---|---|
| 7,179,162 B1* | 2/2007 | Twiner | ............... | A22C 25/025 |
| | | | | 452/105 |
| 7,290,490 B2* | 11/2007 | Goldberg | ............ | A47B 23/001 |
| | | | | 108/24 |
| 7,908,977 B2* | 3/2011 | Zak | ...................... | A47B 31/02 |
| | | | | 108/26 |
| 8,397,647 B1* | 3/2013 | Riegel | ................. | A61M 16/00 |
| | | | | 108/24 |
| 8,490,551 B1* | 7/2013 | Wagner | ................. | A47B 31/04 |
| | | | | 108/25 |
| 9,623,318 B2* | 4/2017 | Yang | ..................... | A47B 31/02 |
| D859,041 S | 9/2019 | Williamson | | |
| 2006/0240758 A1* | 10/2006 | Sorey | ................ | A22C 25/025 |
| | | | | 452/195 |
| 2009/0056595 A1* | 3/2009 | Dean | ................... | A47B 3/0911 |
| | | | | 108/24 |
| 2009/0163129 A1* | 6/2009 | Durjan | ................ | A22C 25/025 |
| | | | | 452/103 |
| 2013/0186306 A1* | 7/2013 | Thornley | ............... | A47B 3/00 |
| | | | | 108/24 |
| 2015/0059623 A1* | 3/2015 | Brown | .................... | B60R 9/06 |
| | | | | 108/42 |

* cited by examiner

FISH CLEANING TABLE

CROSS REFERENCES

This application is a continuation-in-part of U.S. application Ser. No. 16/439,629, filed on Jun. 12, 2019, which claims the benefit of U.S. Provisional Application No. 62/683,916, filed on Jun. 12, 2018, which applications are incorporated herein by reference.

FIELD OF THE DISCLOSURE

The subject matter of the present disclosure refers generally to a fish cleaning table for use on a dock.

BACKGROUND

Fish cleaning tables are widely used at marinas or at private waterfront properties where fishermen clean fish. The tables may be attached to a dock that is positioned over water or at the edge of a body of water adjacent to the property. The tables are typically attached to the dock near an edge of the dock adjacent the water. Such an arrangement allows for easy disposal of fish remains after cleaning by disposing of the remains directly into the water body, where the remains may be eaten by wildlife such as crabs, birds, or other fish. Thus, the arrangement conveniently allows fishermen to avoid the necessity of disposing of fish remains through normal municipal trash disposal, which may require fish remains to be stored in trash cans kept near homes or businesses until the next designated day on which trash is collected. Storing fish remains in this way, even just temporarily, may attract flies or animals and may also produce strong and unpleasant odors.

However, such fish cleaning tables have some drawbacks. For example, fish cleaning tables are often cleaned with a water hose by spraying the surface of the table with the hose to use the force of water to flush fish remains into the adjacent body of water. However, when a user cleans the table with a water hose, fish remains may be inadvertently spread onto the surrounding dock or even back onto the user or others in the vicinity of the table. This may be particularly problematic on windy days when the wind may blow water spray from the hose in unintended directions. After contacting the table, the water spray may be contaminated with fish blood or other small pieces of fish remains. Depending on the construction of the table, the cleaning surface may also accumulate some blood and other remains when cleaning fish and thus require frequent flushing with water in order to keep the surface clean.

Accordingly, there is a need in the art for a fish cleaning table designed so that a user may easily dispose of blood or other remains of cleaned fish into an adjacent body of water. Further, there is a need in the art for a fish cleaning table designed so that a user may clean the table during or after use while preventing the blood or other remains of cleaned fish from being inadvertently spread to areas in the immediate vicinity of the table.

SUMMARY

A fish cleaning table is provided. The table comprises a table top fixedly attached to a support leg, wherein the support leg defines a hollow tube having an upper open end at an upper end of the support leg and a lower open end at a lower end of the support leg, wherein the upper open end of the tube is defined by an opening on a top side of the table top. The table further comprises a bracket fixedly attached to the lower end of the support leg. The bracket is adapted to fixedly secure the table to a support structure, such as a dock or similar type of structure. The bracket is preferably a 90-degree angle bracket adapted to fixedly secure the table to an edge of a support structure having a horizontal top and a vertical side. This feature allows the table to be mounted onto and secured to an edge of a dock over a body of water. The bracket may be bolted into the top surface of the dock and into the vertical side surface of the dock for additional stability.

In a preferred embodiment, the table comprises a plurality of front support legs and a plurality of rear support legs each fixedly attached to the table top and a plurality of brackets each fixedly attached to a respective lower end of one rear support leg and to a respective lower end of one corresponding front support leg, wherein each bracket is adapted to fixedly secure the table to a support structure. Each bracket may preferably be a 90-degree angle bracket. Each of the rear support legs defines a hollow tube having an upper open end at an upper end of each rear support leg and a lower open end at the lower end of each rear support leg, wherein the upper open end of each tube is defined by an opening on a top side of the table top.

The table top provides a cutting surface for cleaning fish or other purposes for which a table top may be used. The openings on the top side of the table top are preferably located adjacent to a back end of the table top. The lower open end of each tube within a rear support leg is preferably positioned at or below the top surface of the dock or other support structure when the table is fixedly secured to the support structure via the brackets. When cleaning fish or other game, the table top may be cleaned easily with water spray from a hose by washing blood and other remains of cleaned fish toward the back end of the table top and into the openings of the tubes defined by the rear support legs. The blood and any other fish remains may then be flushed down through the tubes and discharged from the lower open end of each tube directly into the water below the dock from a discharge point at or below the top of the dock. Thus, the tubes provide a conduit for blood and remains to be moved directly from the table top into the water. This arrangement prevents the blood or other fish remains from coming into contact with either a user cleaning fish or with the top surface of the dock or other items or individuals that may be on the dock. Thus, the presently designed fish cleaning table provides convenience in cleaning the table, disposing of fish remains, and in keeping a dock area clean when cleaning fish or other game.

In an optional embodiment, one of the front support legs of the table defines a water pipe having a water inlet connection fitting and a water outlet connection fitting. The water inlet connection fitting is preferably positioned at a lower end of the front support leg, and preferably on a bottom end of the front support leg. When installing the table on a dock, a hole may be drilled through the dock and a water inlet line from a municipal water supply may be run under the dock and connected to the bottom end of the front support leg through the hole in the dock so that the water inlet line is not visible from the surface of the dock. The water outlet connection fitting is preferably positioned at an upper end of the front support leg adjacent to the attachment point at which the front support leg is fixedly attached to the table top. A flexible hose may then be connected to the water outlet fitting for use in washing down the table during or after use in cleaning fish. This arrangement allows the water inlet line to be hidden from sight and the hose to be connected directly to the table itself. Water flows through the front support leg of the table directly to the hose, which may be connected to the table in very close proximity to the point-of-use of the hose. This arrangement allows the hose to be relatively short in length due to its proximity to the table top, and the hose may be conveniently installed on the table on a permanent basis for immediate use in cleaning the table at any time.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. As used herein, the term "created vector" and grammatical equivalents refers to the one or more vectors created by the processor based on the mapped activation levels of the one or more sensors.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
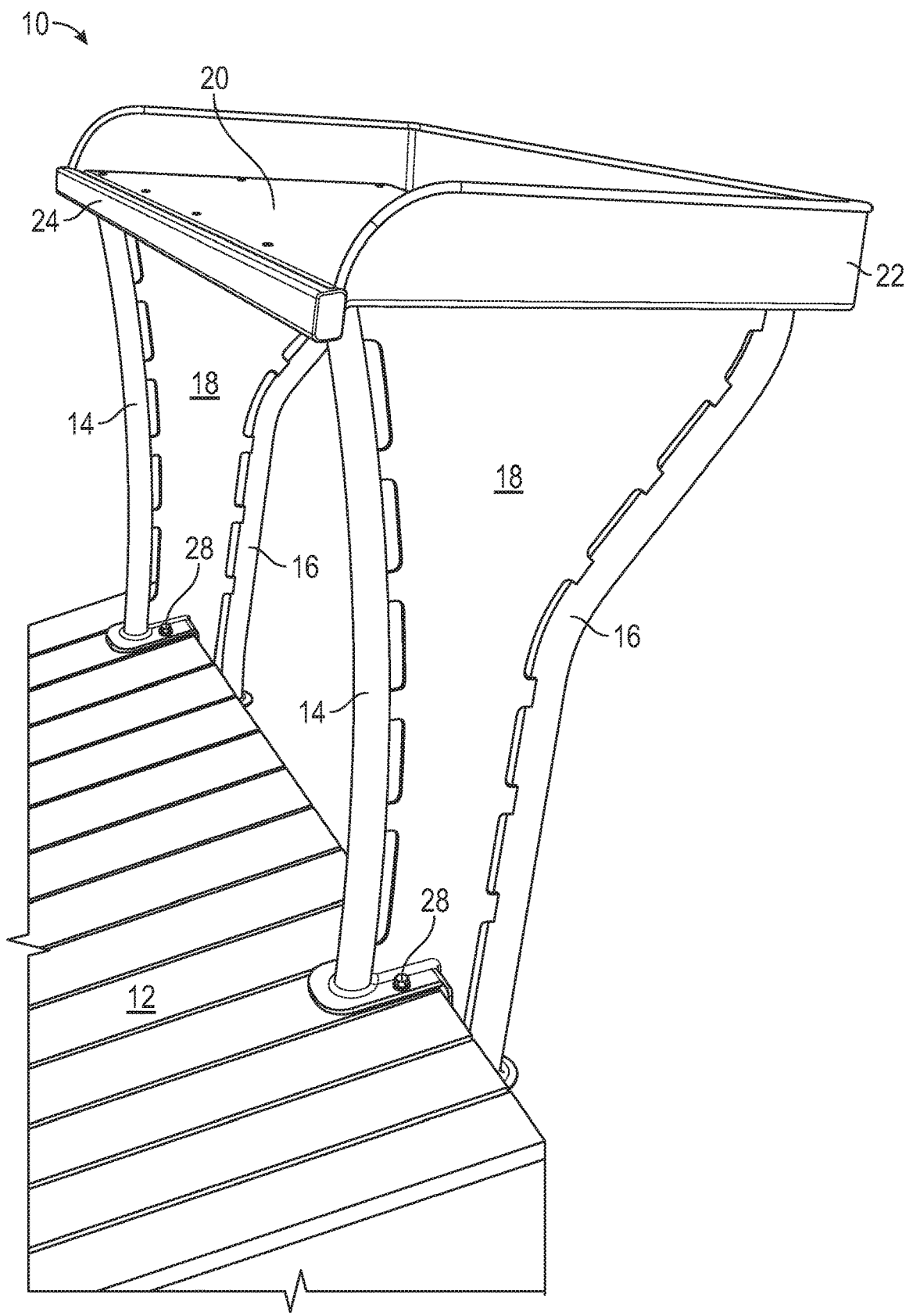
FIG. 1 is a perspective view of a fish cleaning table fixedly secured to a dock in accordance with the present disclosure.
Figure 2:
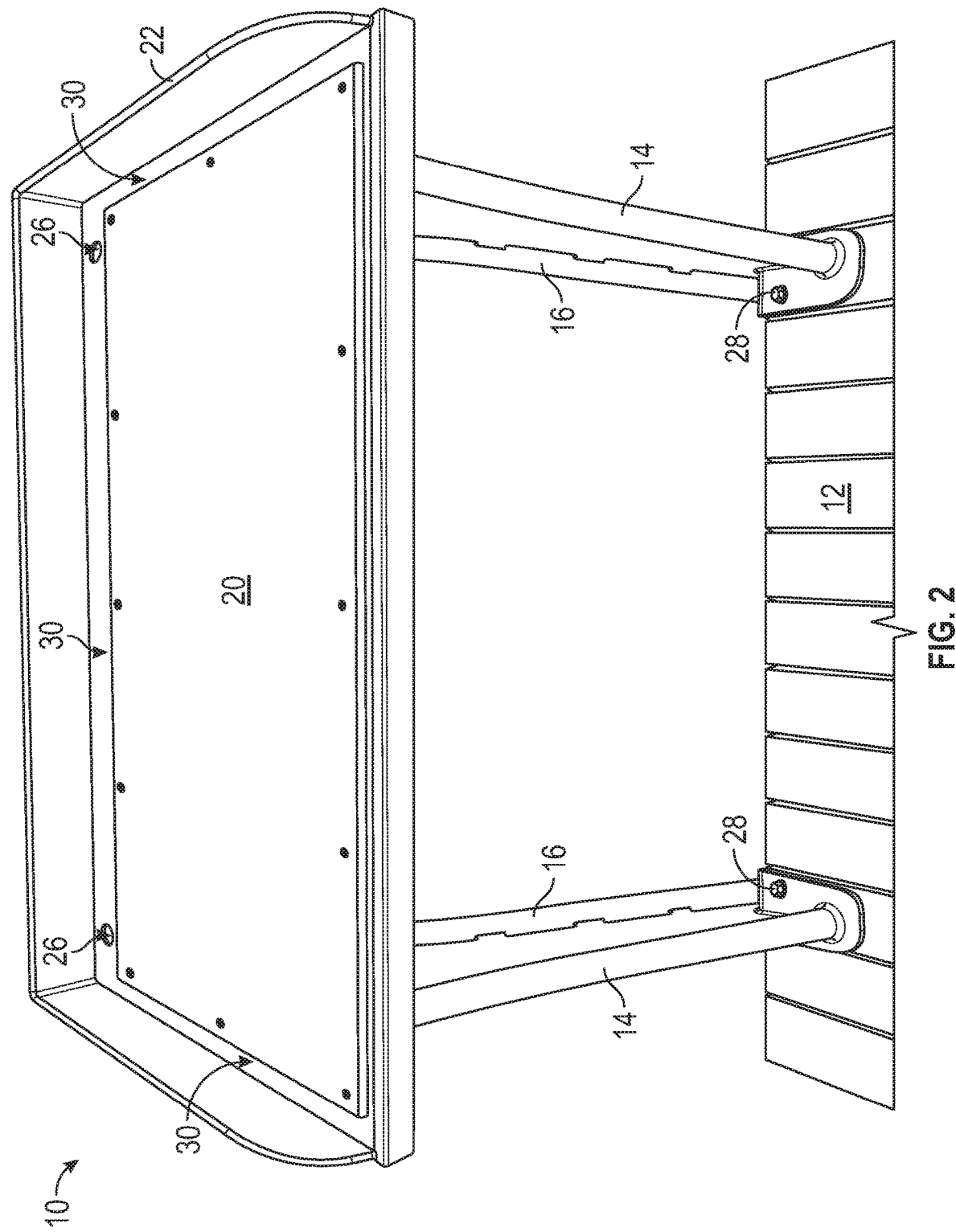
FIG. 2 is a perspective view of a fish cleaning table fixedly secured to a dock in accordance with the present disclosure.
Figure 3:
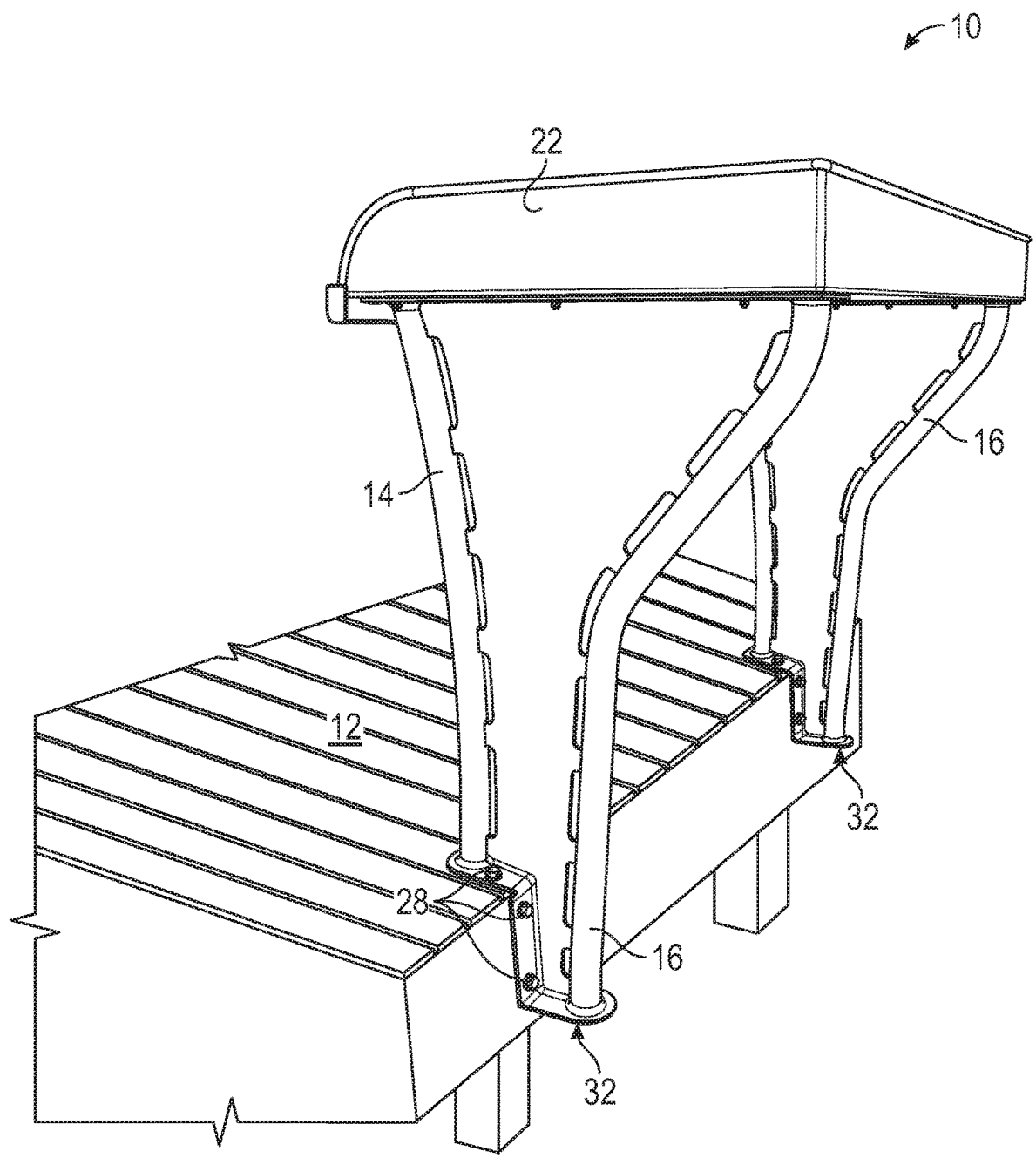
FIG. 3 is a perspective view of a fish cleaning table fixedly secured to a dock in accordance with the present disclosure.

Turning now to the drawings, FIGS. 1-4 illustrate a preferred embodiment of a fish cleaning table 10 in accordance with the present disclosure. The table 10 comprises a table top 30 fixedly attached to and supported by support legs 14 and 16. Preferably, as shown in FIG. 1, the table 10 comprises front support legs 14 and rear support legs 16. Each of the rear support legs 16 defines a hollow tube that forms an interior passageway within each rear support leg 16. As best seen in FIGS. 2 and 3, each tube has an upper open end 26 at an upper end of each rear support leg 16 and a lower open end 32 at a lower end of each rear support leg 16. As shown in FIG. 2, the upper open end of each tube is defined by an opening 26 on a top side of the table top 30. The lower open end 32 is defined by an opening at the lower end of each rear support leg 16. Thus, the tube provides a direct conduit between the table top 30 and a low point 32 of the table 10.

Figure 4:
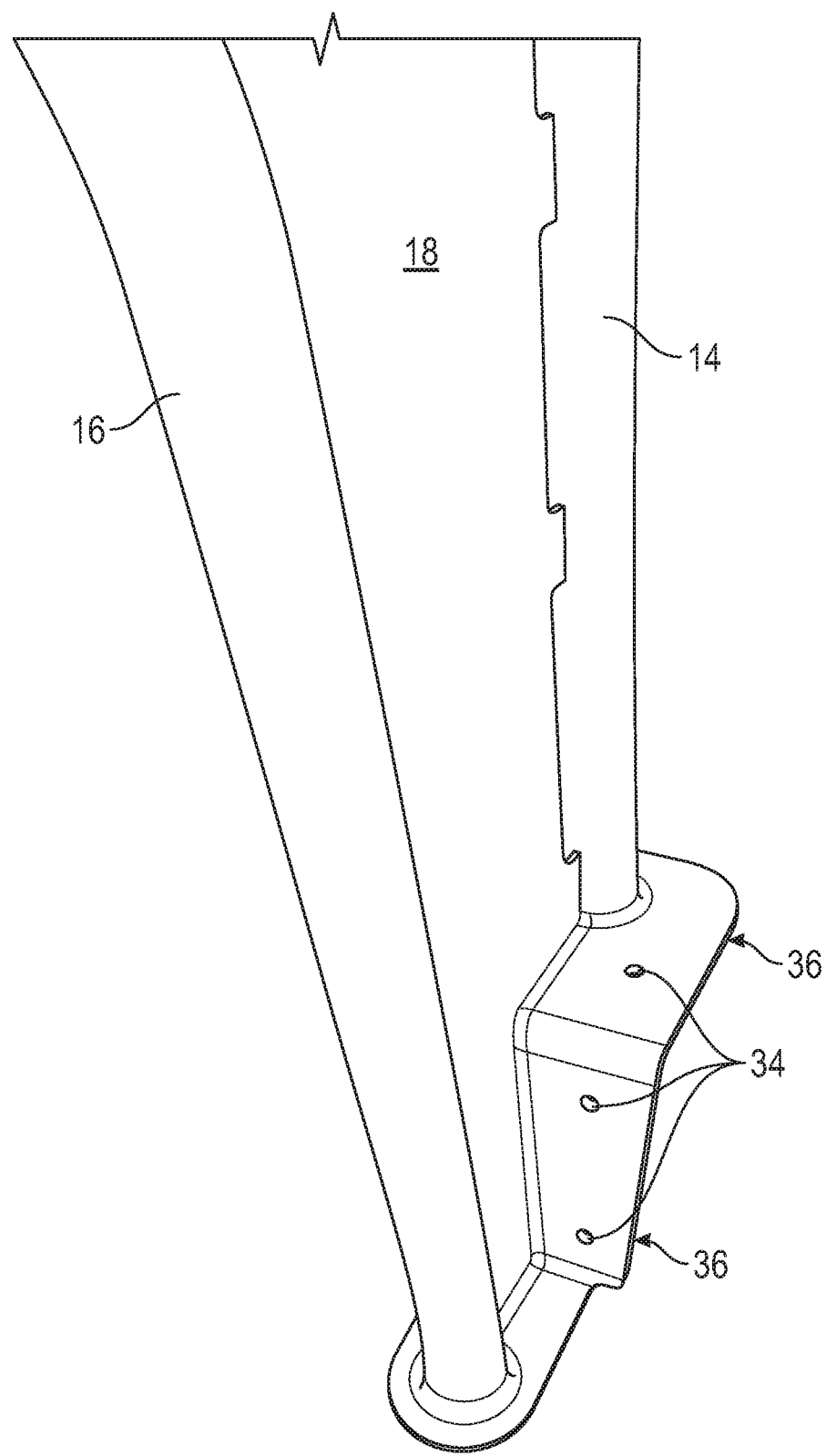
FIG. 4 is a partial perspective view of a bracket attached to support legs of a fish cleaning table for fixedly securing the table to a dock in accordance with the present disclosure.

The table 10 further comprises at least one bracket 36, and preferably a plurality of brackets 36. As best seen in FIGS. 3 and 4, each bracket 36 is fixedly attached to a respective lower end of one rear support leg 16 and to a respective lower end of one front support leg 14. Each bracket 36 is adapted to fixedly secure the table 10 to a support structure 12, such as a dock or similar type of structure. As best seen in FIGS. 3 and 4, each bracket 36 is preferably a 90-degree angle bracket adapted to fixedly secure the table 10 to a 90-degree edge of a support structure 12 having a horizontal top and a vertical side. In alternative embodiments, brackets having different configurations may be utilized depending on the shape of the structure onto which the table 10 is to be mounted. Using a 90-degree angle bracket 36, the table 10 may be mounted onto and fixedly secured to an edge of a dock 12 over a body of water, as best seen in FIG. 3. Each bracket 36 may have a plurality of holes 34 for securing the bracket 36 to the support structure 12 using fasteners, which are preferably bolts 28. In many cases, the dock 12 to which the table 10 will be mounted will be made of wood, so appropriate bolts 28 or wood screws may be utilized. If the dock is made of concrete or other material, different types of fasteners may be selected that are suitable for fixedly securing the table 10 to a concrete support structure 12. Using a 90-degree angle bracket, the table 10 may be fixedly secured to the dock 12 by bolting each of the brackets 36 into a top surface of the dock and into a side surface of the dock for additional stability, as shown in FIGS. 1-3. In an alternative embodiment, the brackets may be U-shaped and sized so that each bracket fits around a top surface, a side surface, and a bottom surface of a dock, and the table may be secured by bolts that extend through both the top surface and through a bottom surface of the dock. Such an embodiment may be specifically designed for a particular dock and may be advantageous for use on a dock that does not have a vertical side surface large enough to provide adequate additional support for the table. In another alternative embodiment, the bracket may be a straight bracket used to fasten the table to a flat top surface of a dock, and the table may be installed adjacent to the edge of the dock so that the discharge point at the lower open end 32 of each tube is positioned over the edge of the dock above the water. The size and shape of the brackets 36 may be customized and fabricated for specific support structures 12.

The table top 30 provides a cutting surface 20 for cleaning fish or other activities. In some embodiments, the cutting surface may be defined by the top side of the table top 30 so that fish may be cleaned directly on the table top 30. In a preferred embodiment, as best seen in FIG. 2, a separate cutting surface may be provided by a cutting board 20 that may be secured directly to the table top 30 by fasteners such as bolts. The cutting board 20 may be made of the same or different material as the table top 30. For instance, in a preferred embodiment, the table top 30, as well as the front and rear support legs 14 and 16 and associated brackets 36, are made of a material comprising aluminum, which is preferably an aluminum alloy. In a preferred embodiment, 5052 aluminum alloy may be utilized due to its properties of corrosion resistance against salt water in marine environments. However, other suitable materials may be utilized. Preferably, the table top 30, the front and rear support legs 14 and 16, and the brackets 36 attached to the support legs are all welded together so that these components are integrally attached to each other. Alternatively, the support legs may be bolted to the table top for ease of on-site assembly. The cutting board 20 may be made of the same material, such as 5052 aluminum alloy, or of a different material suitable for use as a cutting surface. In a preferred embodiment, as best seen in FIG. 2, the cutting board 20 has a smaller area than the top side of the table top 30 and has a profile above the top side of the table top 30 so that the cutting board 20 generally forms a trough around the edges of the cutting board 20. Thus, the openings 26 in the table top 30 may be positioned at low points relative to the cutting surface.

The openings 26 on the top side of the table top 30 are preferably positioned adjacent to a back end of the table top 30, as best seen in FIG. 2. In addition, the lower open end 32 of each rear support leg 16 is preferably positioned at or below the top surface of the dock 12, as best seen in FIG. 3. When cleaning fish or other game, the top side of the table top 30 and the optional cutting board 20 may be cleaned easily with water from a hose by washing blood and other remains of cleaned fish toward the back end of the table top 30, into the openings 26 in the table top 30 that form the openings of the tubes defined by the rear support legs 16, and down through the tubes into the water below the dock 12. Thus, the tubes of the rear support legs 16 provide a conduit for flushing blood and remains directly from the table top 30, including the cutting board 20, into the water below the dock 12. The blood and remains are discharged from the lower open end 32 directly into the water from a discharge point positioned at or below the top surface of the dock, as best seen in FIG. 3. This arrangement prevents the blood or other fish remains from coming into contact with a user cleaning fish, with the top surface of the dock, or with any other items or people that may be on the dock. Thus, the presently designed fish cleaning table provides convenience in keeping a fish cleaning area clean while minimizing contamination of a user or surfaces in the vicinity of the user by blood or other fish remains.

In a preferred embodiment, the table 10 further comprises a side wall 22 fixedly attached to the table top 30 and extending upwardly from the table top 30. The side wall 22 is preferably disposed along the back end of the table top 30 and along two opposing side ends of the table top 30, as best seen in FIG. 2. The side wall 22 is positioned along a perimeter of the table top 30 behind and adjacent to the openings 26 on the top side of the table top 30. The side wall 22 is preferably made of the same material as the table top 22 and may be welded to the table top 30 so that the components are integrally attached. The side wall 22, along with the profiled cutting board 20, may form a trough that is lower than the cutting board surface around the perimeter of the cutting board 20 to funnel fish blood and remains off of the cutting board 20 and into the openings 26 in the table top 30. The side wall 22 may prevent fish blood and remains from being washed over the edge of the table top 30 when cleaning the table 10 with a water hose. The side wall 22 may thus help to direct the blood and remains down into the openings 26 into the tubes with the flow of water and out to the discharge point at the lower open end 32 of the rear support legs 16. In a preferred embodiment, the table top 30 is sloped slightly downward from a front end of the table top 30 toward the back end of the table top 30 (where the openings 26 to the tubes are located) when the table 10 is fixedly secured to the support structure 12 via the brackets 36 with the table 10 in an upright position for normal use, as shown in FIGS. 1-3. Thus, the sloped top surface of the table top 30 may form a localized low area along the back end of the table top 30 where the openings 26 are located, which may facilitate the funneling of fish blood and remains from the cutting board 20 into the openings 26 positioned along the back end of the table top 30 when cleaning the table top 30 with water spray.

In a preferred embodiment, the front end of the table top 30 has a bar 24 positioned along a length of the front end, as best seen in FIG. 1. The bar 24 provides a flattened surface on which a user may lean while cleaning fish for the comfort of the user so that the user is not leaning against a sharp edge of the table top.

In another preferred embodiment, as best seen in FIGS. 1 and 3, the table 10 further comprises a support element 18 disposed between and rigidly connecting each set of front and rear support legs 14 and 16. Preferably, each support element 18 is made of the same material as the support legs 14 and 16 and is welded to both a front and a rear support leg 14 and 16 so that the components are integrally attached. The support elements 18 may provide additional support for the table to help ensure that the table 10 is stable when being used.

The table 10 shown in FIGS. 1-3 is an illustrative embodiment having two front support legs 14 and two rear support legs 16. However, it should be understood that the present table 10 may comprise additional sets of front and rear support legs 14 and 16 and still fall within the scope of the present disclosure. For instance, when used on large docks 12, such as those at public marinas, which may be used simultaneously by a large number of fishermen cleaning fish at any given time, a longer table 10 may be preferred. In this case, the table may preferably have three or more sets of front and rear support legs 14 and 16 (with each rear support leg 16 providing an internal tube and corresponding opening 26 on the table top 30) at spaced intervals along the length of the table 10. This arrangement would provide additional brackets 36 to adequately support a larger table. This arrangement would also provide additional openings 26 located on the table top 30 and thus additional discharge points located at the lower open end 32 of each of the rear support legs 16. In a preferred embodiment, the rear support legs 16 may be spaced three to four feet apart from each other and should be spaced close enough together to provide an adequate number of openings 26 for flushing fish remains into the tubes within the rear support legs 16 for discharge into the water below.

Figure 5:
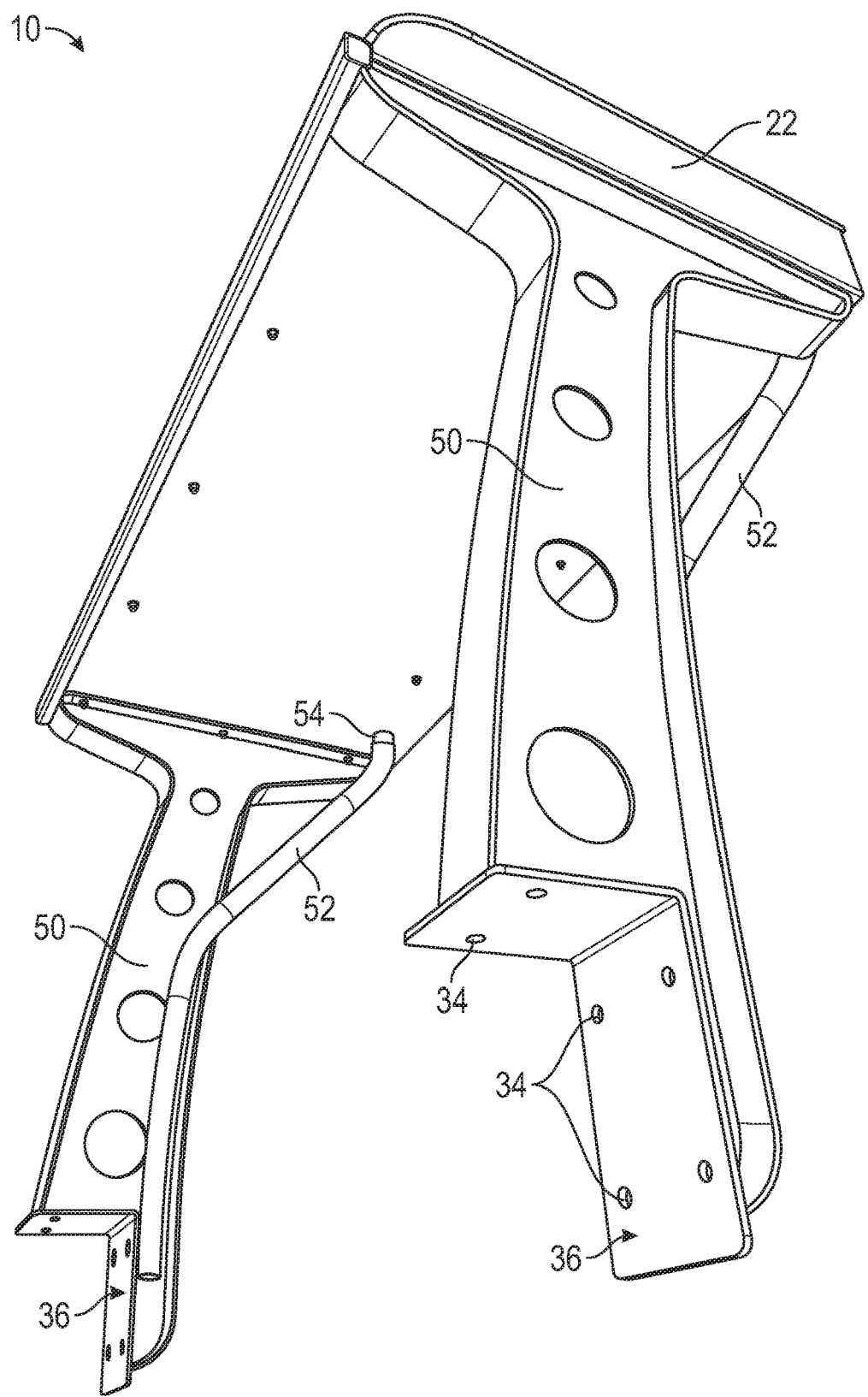
FIG. 5 is a perspective view of an alternative embodiment of a fish cleaning table in accordance with the present disclosure.

FIG. 5 illustrates an alternative embodiment of the present table 10. In this embodiment, a single support leg 50 is utilized in place of each set of front and rear support legs. The single support leg 50 does not have an internal tube as in the embodiment shown in FIGS. 1-4. Instead, a tube 52 that is a separate component from the support leg 50 is utilized as the conduit for fish blood and remains. The tube 52 utilized in this embodiment may be a flexible tube that is detachable from the table 10. In a preferred embodiment, a bottom surface of the table top 30 has extensions 54 that extend downward from the bottom surface and define the openings 26 that extend through the table top 30, and the tubes 52 may be connected to and detached from the extensions 54. For instance, the flexible tubes 52 may be fitted over the extensions 54 to connect the tubes thereto, as shown in FIG. 5. The tubes may be later removed for cleaning, replacement, for aesthetic reasons, or if the tubes are not needed or desired for any other reason. Alternatively, an upper end of each tube 52 may have male threads and the extensions 54 may have corresponding female threads for removably securing the tubes 52 to the table 10 and for detaching the tubes therefrom.

As shown in FIG. 5, a bracket 36 is attached to a lower end of each of the support legs 50 for securing the table 10 to a dock 12 or similar structure. The table of this embodiment preferably includes both a side wall 22 and a bar 24 positioned along a length of the front end of the table top 30, as in the previously described embodiment.

Figure 6:
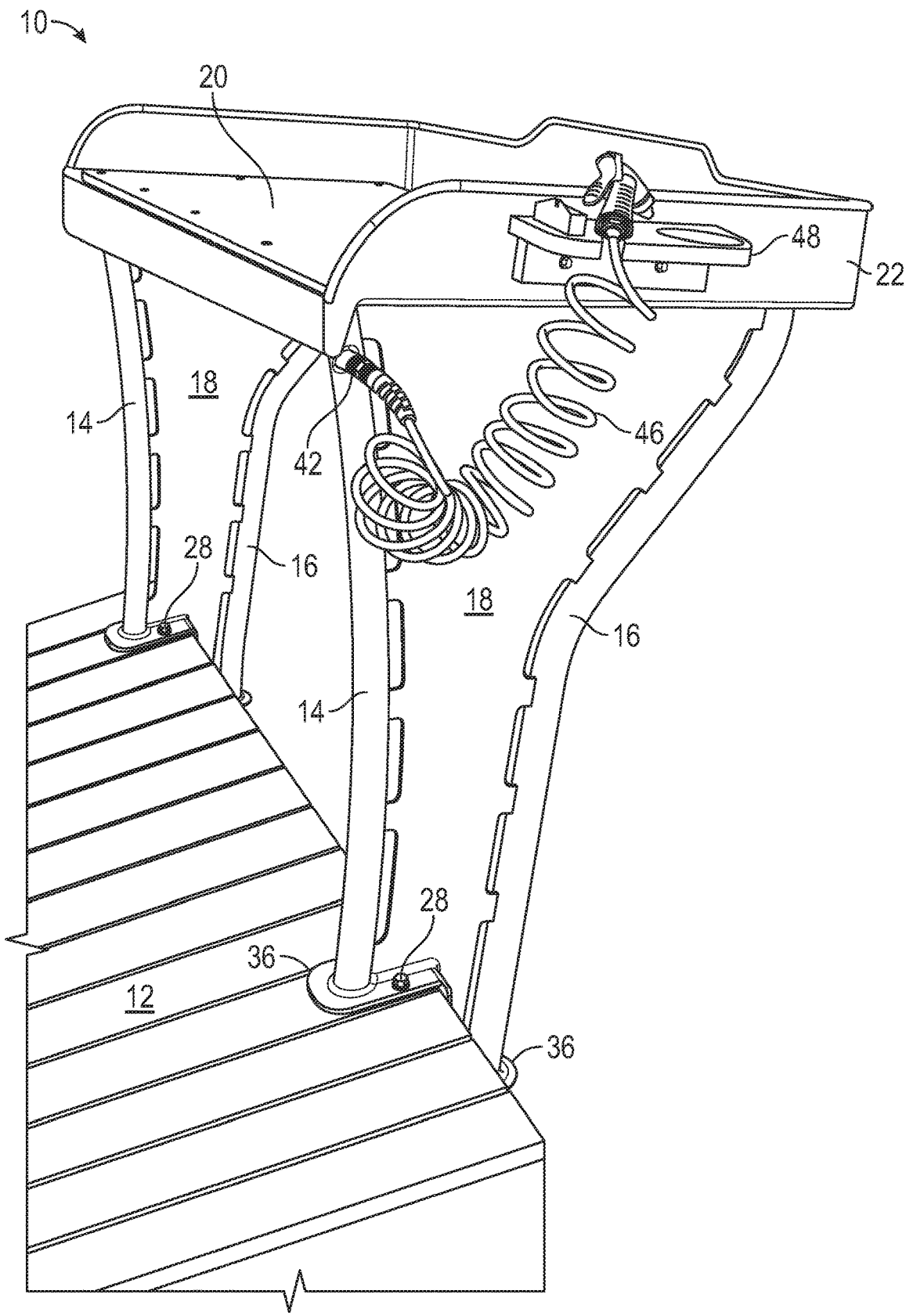
FIG. 6 is a perspective view of a fish cleaning table fixedly secured to a dock in accordance with the present disclosure.
Figure 7:
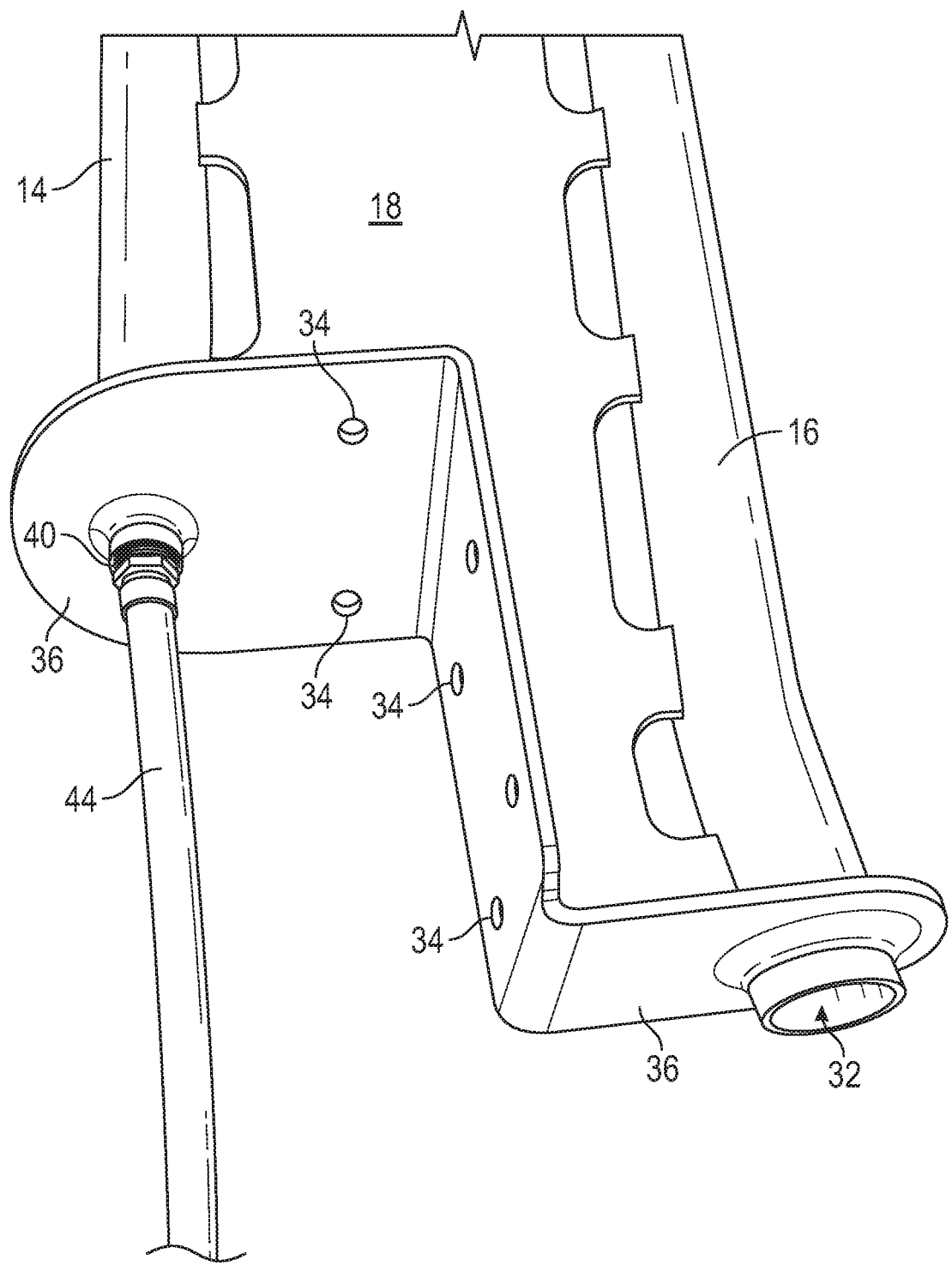
FIG. 7 is a partial perspective view of a bracket attached to support legs of a fish cleaning table with a water inlet connection fitting for connecting a water line thereto in accordance with the present disclosure.
Figure 8:
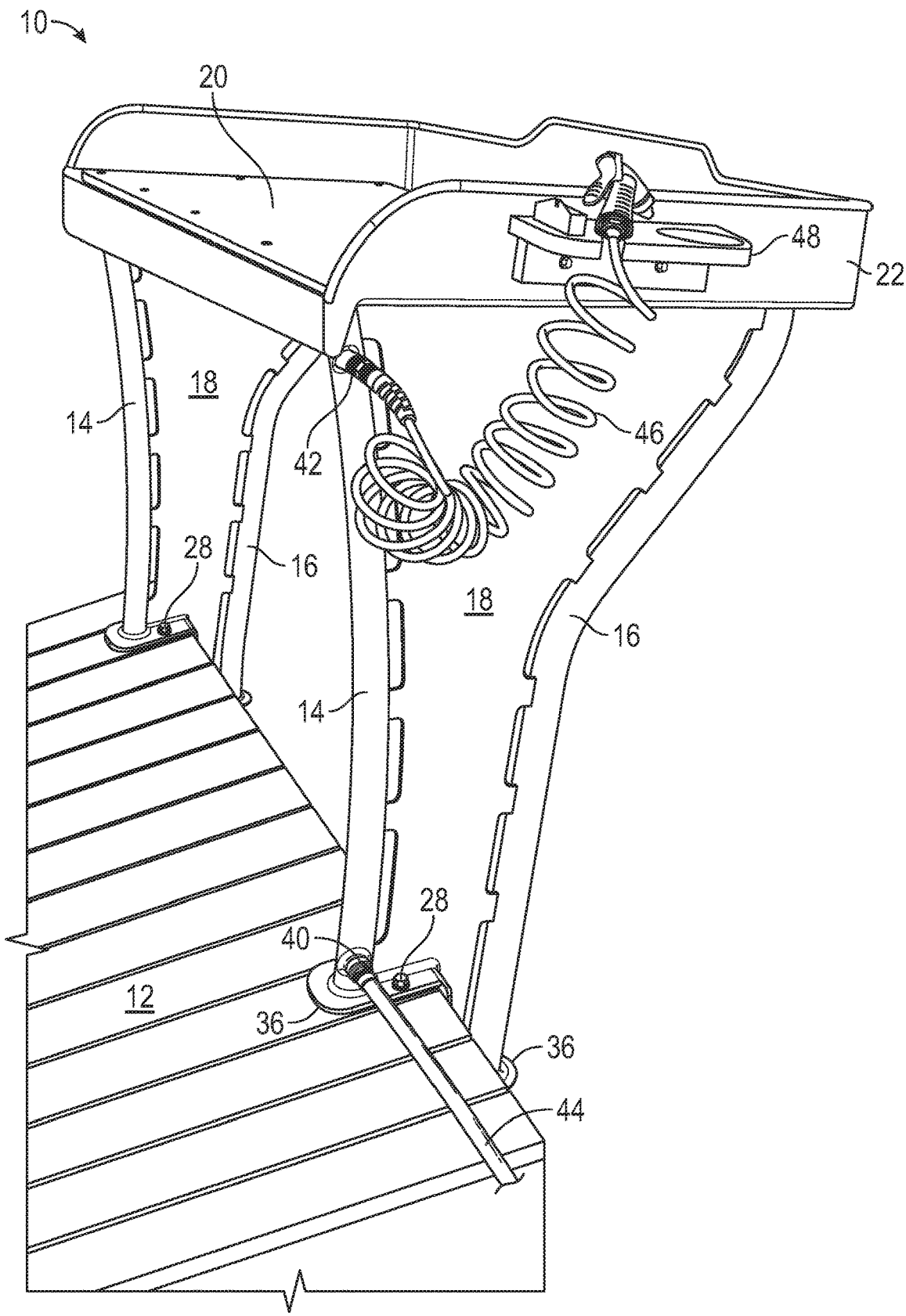
FIG. 8 is a perspective view of a fish cleaning table fixedly secured to a dock in accordance with the present disclosure.

FIGS. 6-8 illustrate an optional alternative embodiment of the present table 10 in which at least one of the support legs defines a water pipe having a water inlet connection fitting 40 and a water outlet connection fitting 42 so that water may flow from a water inlet line 44 connected to the inlet fitting 40, through the support leg 14, and to a hose 46 connected to the outlet fitting 42. Thus, one of the support legs of the table 10 functions as both a table leg directly providing support for the table top 30 and also as a section of water piping supplying water directly to a hose 46 used for cleaning and washing down the table top 30 and/or cutting surface 20 of the table. In a preferred embodiment, the table 10 includes both a support leg defining a water pipe for supplying water directly to the table and also a separate support leg defining a drain tube as shown in FIGS. 1-4. The support leg defining a water pipe is preferably a front support leg, and the support leg defining a drain tube is preferably a rear support leg.

In a preferred embodiment, as shown in FIGS. 6-8, the table 10 comprises a table top 30 fixedly attached to a first support leg 16 and to a second support leg 14. The first support leg 16 defines a hollow tube having an upper open end at an upper end of the first support leg 16 and a lower open end 32 at a lower end of the first support leg 16. The upper open end of the tube is defined by an opening 26 on a top side of the table top 30. The second support leg 14 defines a water pipe having a water inlet connection fitting 40 and a water outlet connection fitting 42. In a preferred embodiment, as shown in FIGS. 6-8, the first support leg is a rear support leg 16, and the second support leg is a front support leg 14. Preferably, the table has a plurality of front support legs 14 and a plurality of rear support legs 16, and each rear support leg 16 defines a respective tube for draining the table top 30, while only one front support leg 14 has water inlet and outlet connection fittings 40, 42, though the table may optionally have multiple respective front legs 14 with fittings 40, 42 for connecting water lines 44 and hoses 46, which may be advantageous particularly with larger tables having three or more sets of front and rear legs.

In a preferred embodiment, a bracket 36 is fixedly attached to the lower end of the rear support leg 16 and preferably also to the front support leg 14, as best seen in FIG. 7. The bracket 36 is adapted to fixedly secure the table to a support structure, which is preferably a dock 12. As shown in FIGS. 6-8, the water inlet connection fitting 40 is preferably positioned at a lower end of the front support leg 14, and the water outlet connection fitting 42 is preferably positioned at an upper end of the front support leg 14. FIGS. 6 and 7 illustrate a preferred embodiment of the table in which the water inlet connection fitting 40 is positioned on a bottom side of the bracket 36. FIG. 8 illustrates an alternative embodiment in which the water inlet connection fitting 40 is positioned on a top side of the bracket 36.

As best seen in FIG. 7, in a preferred embodiment, the water inlet connection fitting 40 is positioned on a bottom end of the front support leg 14. The bracket 36 that secures the table 10 to the dock 12 is preferably attached to the lower end of the front support leg 14, and thus the water inlet connection fitting 40 is preferably also positioned on the bottom side of the bracket 36. Thus, a water inlet line 44, which may supply water from a municipal water source, may be connected to the inlet fitting 40 so that the water supply line 44 is inline with the pipe formed by the front support leg 14. When installing the table on a dock 12, a hole may be drilled at the top surface of the dock and down through the dock, and the water inlet line 44 may then be run under the dock and connected to the bottom end of the front support leg 14 through the hole drilled in the dock. The bracket 36 may then be screwed or bolted into the dock 12 to secure the table in place with the water inlet line 44 permanently connected to the inlet fitting 40 beneath the bracket 36 and thus under the dock 12. FIG. 6 illustrates the table installed on a dock 12 in this manner. As shown in FIG. 6, the water inlet line 44 is not visible from the top surface of the dock.

In an optional embodiment, the front support leg 14 may have a greater length so that a length of the front support leg 14 may extend below the bracket 36 and through the hole drilled in the dock 12 when installing the table, which may provide additional working space for connecting the water inlet line 44 to the inlet fitting 40 under the dock 12 during installation. In this case, the inlet fitting 40 may be positioned inline with the pipe formed by the front support leg 14 or transverse to the pipe. Additionally, in this embodiment, one front support leg 14 may be longer than another front support leg 14 if only one of the front support legs 14 includes water piping with inlet and outlet connection fittings 40 and 42.

As shown in FIG. 6, a flexible hose 46 may then be connected to the water outlet fitting 42 for use in washing down the table 10 during or after use in cleaning fish. Thus, in the embodiment shown in FIGS. 6 and 7, the water inlet line 44 supplying water from a water source to the hose 46 may be completely hidden from sight, which may provide an aesthetic benefit for the table and general dock area around the table. In addition, the water inlet line 44 may thus be installed in a location under the dock in which the water line 44 is placed out of the way of anyone using the table or the dock area generally, which may be beneficial by providing unobstructed access to all areas of the dock and around the table. However, in circumstances in which installation of the water line 44 below the dock 12 is impractical for any reason, the water inlet connection fitting 40 may optionally be positioned at the lower end of the front support leg 14 but on a top side of the bracket 36, as shown in FIG. 8, so that the water inlet line 44 may be installed above the dock 12. In this case, the water inlet connection fitting 40 may be positioned on the outside of the front support leg 14, as shown in FIG. 8, or alternatively on the inside of the front support leg 14, depending on user preference regarding installation of the water line 44.

After installation of the table and the water inlet line 44, the hose 46 may then be connected directly to the table 10 via the water outlet connection fitting 42. Water may then flow through the front support leg 14 and directly to the hose 46, which may be connected in very close proximity to the point-of-use of the hose, as shown in FIG. 6. This arrangement allows the hose 46 to be relatively short in length due to its proximity to the table top 30 and also allows the hose 46 to be permanently installed at the table for immediate use in cleaning the table at any time. A holder 48 for the hose 46 may be installed on the table to hold the hose spray nozzle in a location for convenient access for anyone using the table.

The connection fittings 40 and 42 are preferably threaded fittings, which may be welded directly onto the support leg 14 that functions as a water pipe to provide fluid access to the interior of the pipe. In a preferred embodiment, each fitting 40, 42 may comprise a female threaded fitting that is welded directly onto the support leg and an adaptor having compatible corresponding male threads at one end. The adaptor may be threaded into the female threads welded onto the support leg, and the water line 44 or hose 46 may then be connected to the adaptor. In a preferred embodiment, the adaptor used for the water outlet connection fitting 42 may have a second set of male threads for connecting a hose 46 having a female threaded connection. In a preferred embodiment, the water inlet line 44 comprises tubing and the adaptor used for the water inlet connection fitting 40 has a nipple sized for connecting the tubing to the nipple. Alternatively, the water inlet line 44 may comprise threaded pipe, and the adaptor may have threads for connecting the inlet line 44 to the inlet fitting 40. It should be understood by one skilled in the art that the present fittings 40, 42 may include any type of fitting or combination of fittings suitable for connecting a water line 44 or a hose 46 to the fitting 40, 42 in order to supply water to the hose 46 from the water inlet line 44 through the support leg 14 of the table. The fittings 40, 42 may also optionally include valves for shutting off the flow of water at the fitting.

It is understood that versions of the invention may come in different forms and embodiments in addition to the preferred embodiments disclosed herein. Additionally, it is understood that one of skill in the art would appreciate these various forms and embodiments as falling within the scope of the invention as disclosed herein.

What is claimed is:

1. A table comprising a table top fixedly attached to a first support leg and to a second support leg,
    wherein the first support leg defines a hollow tube having an upper open end at an upper end of the first support leg and a lower open end at a lower end of the first support leg, wherein the upper open end of the tube is defined by an opening on a top side of the table top, wherein the tube extends continuously from the lower end of the support leg to the top side of the table top, and
    wherein the second support leg defines a water pipe having a water inlet connection fitting and a water outlet connection fitting, wherein the water outlet connection fitting is integrally attached to the support leg and disposed on an exterior of the support leg, wherein the outlet connection fitting is configured to connect a hose to the outlet connection fitting so that the hose is disposed on the exterior of the support leg.

2. The table of claim 1, further comprising a bracket fixedly attached to the lower end of the first support leg, wherein the bracket is adapted to fixedly secure the table to a support structure.

3. The table of claim 2, wherein the water inlet connection fitting is positioned on a bottom side of the bracket.

4. The table of claim 2, wherein the water inlet connection fitting is positioned on a top side of the bracket.

5. The table of claim 1, further comprising a flexible hose connected to the water outlet connection fitting.

6. The table of claim 2, wherein the lower open end of the tube is positioned at or below a horizontal top surface of the support structure when the table is fixedly secured to the support structure via the bracket.

7. The table of claim 2, wherein the bracket is a 90-degree angle bracket adapted to fixedly secure the table to an edge of a support structure having a horizontal top and a vertical side.

8. The table of claim 1, wherein the water inlet connection fitting is positioned at a lower end of the second support leg and the water outlet connection fitting is positioned at an upper end of the second support leg.

9. A table comprising:
    a table top,
    a plurality of front support legs and a plurality of rear support legs each fixedly attached to the table top, and
    a plurality of brackets each fixedly attached to a respective lower end of one rear support leg and to a respective lower end of one front support leg, wherein each bracket is adapted to fixedly secure the table to a support structure,
    wherein each rear support leg defines a hollow tube having an upper open end at an upper end of each rear support leg and a lower open end at the lower end of each rear support leg, wherein the upper open end of each tube is defined by an opening on a top side of the table top, wherein each respective tube extends continuously from the lower end of one respective rear support leg to the top side of the table top, and
    wherein one respective front support leg defines a water pipe having a water inlet connection fitting and a water outlet connection fitting, wherein the water outlet connection fitting is integrally attached to the front support leg and disposed on an exterior of the front support leg, wherein the outlet connection fitting is configured to connect a hose to the outlet connection fitting so that the hose is disposed on the exterior of the front support leg.

10. The table of claim 9, wherein the water inlet connection fitting is positioned at a lower end of the front support leg and the water outlet connection fitting is positioned at an upper end of the front support leg.

11. The table of claim 10, wherein the water inlet connection fitting is positioned on a bottom side of the bracket that is attached to the front support leg.

12. The table of claim 10, wherein the water inlet connection fitting is positioned on a top side of the bracket that is attached to the front support leg.

13. The table of claim 9, further comprising a flexible hose connected to the water outlet connection fitting.

14. The table of claim 9, wherein the lower open end of each tube is positioned at or below a horizontal top surface of the support structure when the table is fixedly secured to the support structure via the plurality of brackets.

15. The table of claim 9, wherein each bracket is a 90-degree angle bracket adapted to fixedly secure the table to an edge of a support structure having a horizontal top and a vertical side.

16. A table comprising a table top fixedly attached to a support leg,
   wherein the support leg defines a water pipe having a water inlet connection fitting and a water outlet connection fitting, wherein the water outlet connection fitting is integrally attached to the support leg and disposed on an exterior of the support leg, wherein the outlet connection fitting is configured to connect a hose to the outlet connection fitting so that the hose is disposed on the exterior of the support leg, and
   wherein the table further comprises a bracket fixedly attached to a lower end of the support leg, wherein the bracket is adapted to fixedly secure the table to a support structure.

17. The table of claim 16, further comprising a second support leg that defines a hollow tube having an upper open end at an upper end of the second support leg and a lower open end at a lower end of the second support leg, wherein the upper open end of the tube is defined by an opening on a top side of the table top.

18. The table of claim 16, further comprising a flexible hose connected to the water outlet connection fitting.

19. The table of claim 16, wherein the water inlet connection fitting is positioned on a bottom side of the bracket.

20. The table of claim 16, wherein the water inlet connection fitting is positioned on a top side of the bracket.

* * * * *